Dec. 26, 1944.    D. E. MARSHALL    2,365,769
OVEN
Filed Dec. 27, 1938    12 Sheets-Sheet 3

FIG.3

INVENTOR
DONALD E. MARSHALL,
BY
ATTORNEYS

Dec. 26, 1944. D. E. MARSHALL 2,365,769
OVEN
Filed Dec. 27, 1938 12 Sheets-Sheet 4

Inventor
DONALD E. MARSHALL
by
Attorneys

Dec. 26, 1944.  D. E. MARSHALL  2,365,769
OVEN
Filed Dec. 27, 1938  12 Sheets-Sheet 5

INVENTOR
DONALD E. MARSHALL,
BY
ATTORNEYS.

Dec. 26, 1944.    D. E. MARSHALL    2,365,769
OVEN
Filed Dec. 27, 1938    12 Sheets-Sheet 7

Inventor
DONALD E. MARSHALL
by
Attorneys

Dec. 26, 1944.  D. E. MARSHALL  2,365,769
OVEN
Filed Dec. 27, 1938  12 Sheets-Sheet 11

Inventor
DONALD E. MARSHALL
by
Attorneys

Patented Dec. 26, 1944

2,365,769

UNITED STATES PATENT OFFICE 2,365,769

OVEN

Donald E. Marshall, Battle Creek, Mich., assignor to Kellogg Company, Battle Creek, Mich., a corporation of Delaware Application December 27, 1938, Serial No. 247,936

7 Claims. (Cl. 107—57)

The object of this invention is to provide an oven for the baking of cereal flakes.

One of the objects of this invention is to so bake cereal flakes as to prevent the breakage of the fragile flakes during the course of baking to prevent the accumulation of flakes or pieces of flakes in the conveying mechanism or elsewhere, and to bring about the baking by tossing of the flakes while being baked by the use of air so as to not break the flakes.

It is a further object to circulate heated air to and from the oven to bring about the baking of the flakes and to collect from that air any dust or broken particles of flakes so as to return to the oven any clean air while removing from the oven any accumulation of dust and broken flakes.

It is a further object of the invention to provide a means and mechanism for eliminating discolored or burnt particles amongst the flakes.

It is an additional object to provide means of transferring the flakes by gravity, in the presence of air, to cushion their descent without mechanical means for moving the flakes and thereby prevent breaking the flakes.

It is a further object to provide means of collecting the heavier refuse particles and of intermittently removing said particles mechanically from the oven, in addition to the removal of the air-borne particles.

It is a further object to provide means for both baking the flakes and for cooling the flakes so that they may be delivered in cooled condition.

It is an additional object to provide means of circulating clean heated air through the continuously moving containers for flakes and over and around the flakes, and of arranging the intake and exhaust in zones so that as the flakes progress through the oven the temperature and moisture in each zone may be independently adjusted so that a careful regulation of temperature and moisture contents may be effected.

It is a further object to provide a conveyor comprising a series of endless chains having boxes with perforated bottoms so arranged that the adjacent boxes of adjacent chains will interengage to form complete enclosures with foraminous tops and bottoms through which the heated air may be circulated for both baking the flakes and agitating the flakes without the use of any mechanical agitating means, while at the same time, permitting the movement of the flakes progressively in bodies of restricted amount, step by step, through the machine.

It is a further object to provide a novel form of baskets so arranged that they will not rip the flakes between them and crush the flakes so that the flakes become broken and burnt, contaminating the main body of the flakes.

It is a further object to provide a system of dust collection and heating the oven so as to provide continued circulation of heated air while heating the air and collecting progressively and continuously any dust or foreign particles from the air.

It is a further object of this invention to simultaneously extract dust from the air, heat the air and by removing a certain proportion of the air without dust thereby removing a certain proportion of the moisture in the air which comes from the cooking flakes so as to regulate the humidity content of the oven.

Referring to the drawings.

This section is taken on the line 1—1, looking in the direction of the arrows of Figure 2.

Referring to the drawings in detail, 1 designates the top of the oven, the interior of which is generally designated 2, which indicates the baking compartment, while the numeral 3 indicates the cooling compartment. This baking compartment is provided with suitable end walls 4 and 5 and side walls 6 and 7.

The flakes in unbaked condition are supplied through the chute 8 where they are deposited into baskets 9. The tops of these baskets at this point are open. The baskets 9 are mounted upon the chains 10 at either end. They pass beneath baskets 11 carried on the chains 12, with which they engage. Thus the upper baskets 11 become the top of a composite basket consisting of the basket 11 and the basket 9.

Baskets

Each of these baskets consists of a solid metal box in that the side walls 13 and 14 and end walls 15 and 16 are of solid metal. The bottom of the basket is either of perforated metal or formed of wire mesh, as at 17. When the basket 11 is inverted, its bottom 17 becomes the top of the composite basket. The two baskets interengage on their ends through the flanges 18. Their sides do not engage. For instance, the flange 19 of the upper basket is spaced from the side flange 20 of the lower basket in the next adjacent basket.

The opposite flange of the basket is turned over, as at 21. This leaves a free space between the side walls of the baskets so that flakes will not be caught between these walls, and crushed, broken and burnt. This provides a self-cleaning construction. As air pressure is present on the outside of the baskets as well as the inside, this circulation of air tends to clean and keep clear the space between these side flanges so as to prevent this entrapment of the flakes.

Figure 1:
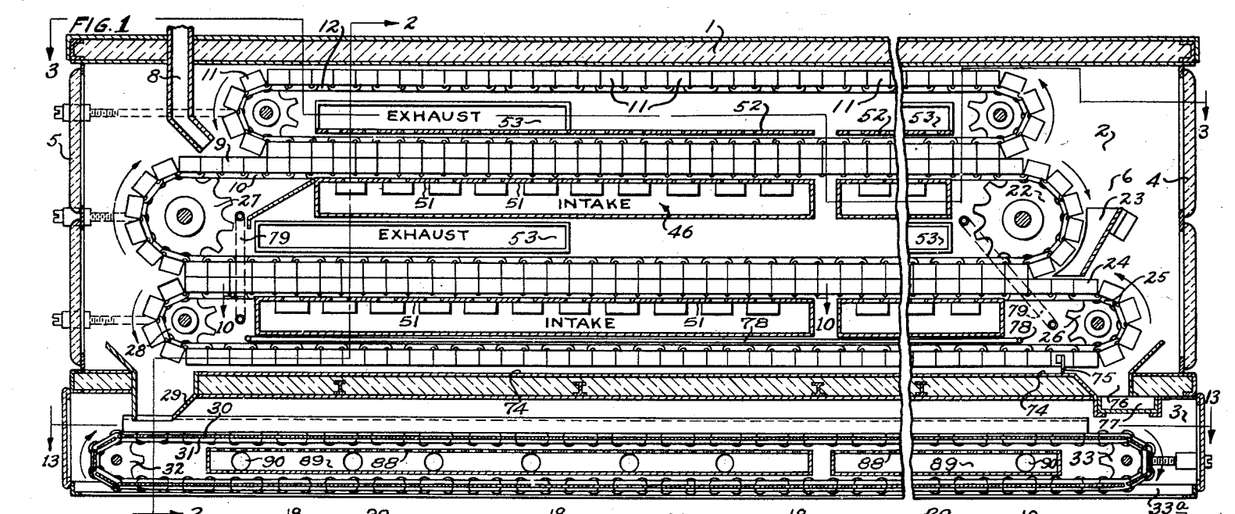
Figure 1 is a vertical section taken longitudinally through the oven.

When the flakes have passed from left to right in Figure 1 on the first flight, at the end of that flight, the baskets 9 and 11 move away from one another so as to uncover the basket 9. Each basket 9 on the chains 10, as the baskets pass around the end of the conveyor, over the sprocket 22, open up for the dual purpose of releasing any entrapped flakes and particularly for the purpose of dumping their contents into the chute 23.

This chute guides the flakes which thus descend in the oven without mechanical handling into the baskets 24 that are mounted on the chains 25 that are passing over the sprocket 26.

In this manner the baskets 24 are loaded with the flakes and after loading, the baskets 9 are now inverted and become the covers of the baskets 24, or the upper half of the baskets. The composite basket formed of baskets 9 and 24 then proceeds from right to left. At the extreme left hand end, the baskets again separate, the baskets 9 passing upwardly over the sprocket 27 and the baskets 24 passing downwardly over the sprocket 28.

The flakes in baskets 24 are then dumped into the air through the chute 29 onto the articulated perforated plates 30 in the cooling conveyor chamber 3. These plates are mounted upon chains 31, which in turn are carried on sprockets 32 and 33. This conveyor conveys the flakes from the left end to the right end, whence they are dumped into the air, as at 33a, whence they pass to some suitable chamber.

Figure 2:
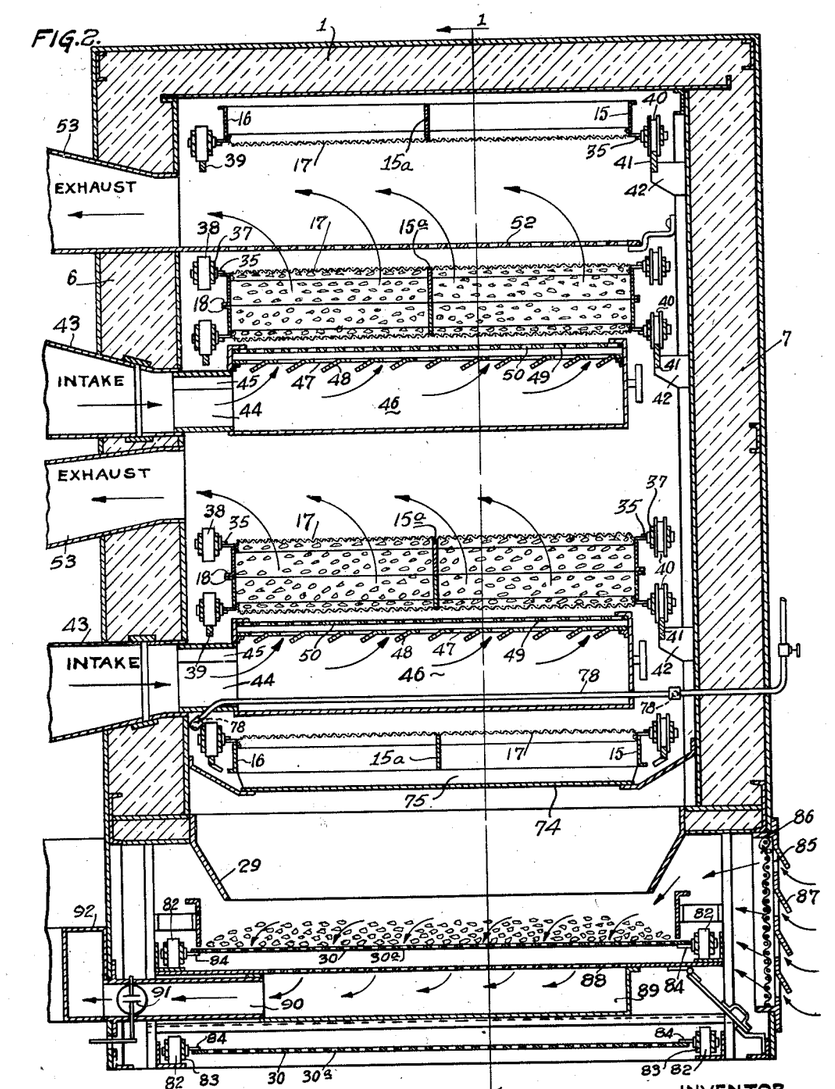
Figure 2 is a vertical transverse section of the oven, taken on the line 2—2, looking in the direction of the arrows of Figure 1.
Figure 3:
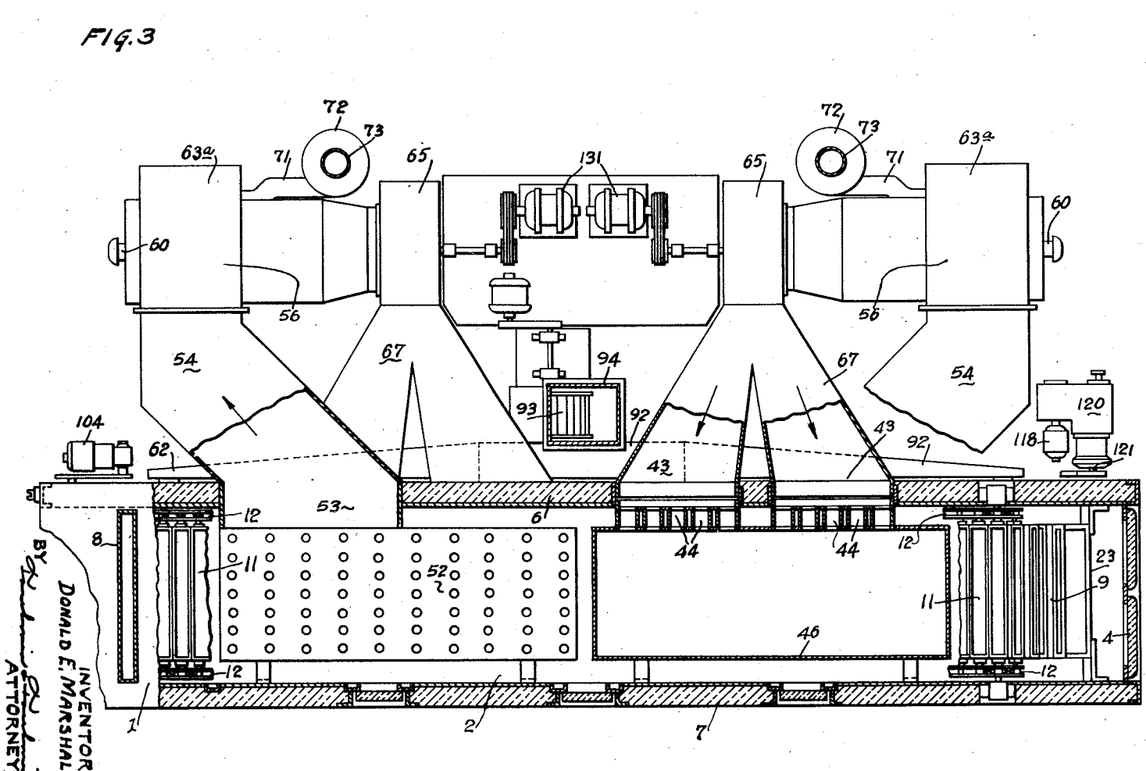
Figure 3 is a top plan view of the oven, dust collection and air circulatory ducts and mechanism with the ducts and the oven partially in section. This section is taken on the line 3—3, looking in the direction of the arrows of Figure 1.

Returning to the baskets, it will be observed that in many instances, the ends of the baskets are provided with flanges 34 for mounting the baskets on the side plates 35 and attaching them with bolts 36. These plates 35 are mounted on the links 37 which constitute the chains heretofore described. These chains are provided (see Figure 2) with smooth surface rollers 38 on the left end, riding on tracks 39 and grooved rollers 40 on the right hand, riding on tracks 41 carried on brackets 42. The baskets are provided with transverse partitions intermediate their ends, designated 15a.

Hot air circulation

The baking of the flakes is progressively effected by the circulation of hot air through the independent bodies of flakes in the independent baskets. This air not only is used to dry and bake the flakes, but is also used as a means of agitating the flakes so as to toss them about in their baskets as they progress through the oven.

Referring particularly to Figures 1, 2, 3, 4, 8, 9, 10, 11 and 12, it will be observed that heated air is supplied as hereinafter described, through the intake ducts 43, whence the air passes through a plurality of independent ducts 44, having gable roofs 45 whence the air passes into a distribution chamber 46 that is closed with the exception of its top, which is provided with a plurality of ports 47. Adjacent these ports are guide fins 48 for guiding the air diagonally and upwardly through perforated plates 49 having jet openings 50, so that jets of air are directed upwardly through the wire bottoms 17 and out through the inverted wire bottoms 17 which form the tops of the composite baskets.

Between these perforated plates 49 are dead plates of solid metal 51 so that as the baskets traverse the air jets, these air jets at intervals have spaces through which no air is passing. As will be seen in Figures 8 and 9, this results in the air passing through and over the flakes and in tossing the flakes progressively in the baskets as indicated by the dot and dash arrows. The full line arrows show the generally vertical direction of the air upwardly through the baskets. After the air passes out through the tops of the baskets, it passes through a perforated plate 52 and thence turns and makes its exit through the exhaust duct 53. A portion of this air is delivered into the oven 2, to and from which it circulates as described.

Figure 8:
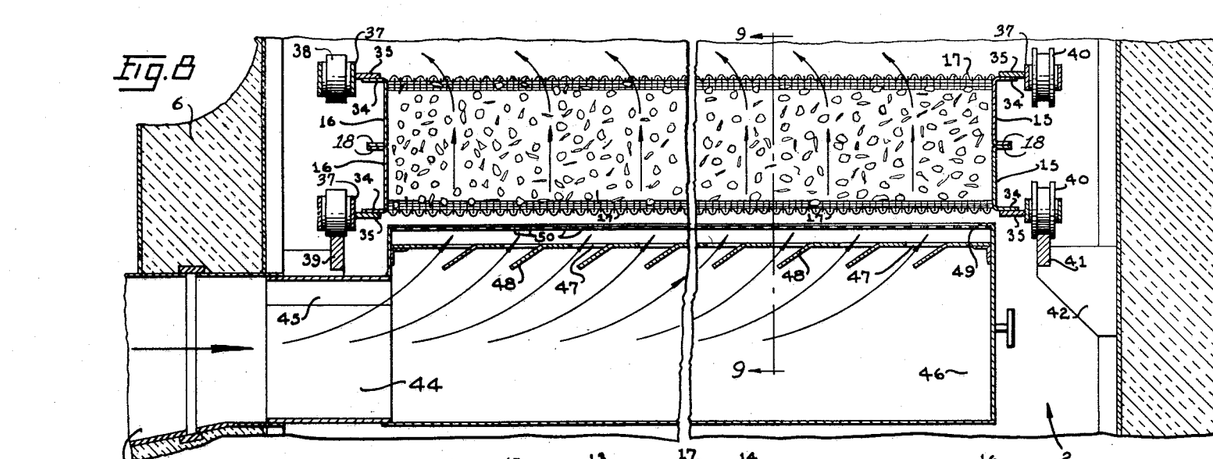
Figure 8 is a section taken transversely through the oven showing in detail the means of guiding the air through the baskets for tossing the flakes, at the same time using the hot air for baking the flakes.
Figure 9:
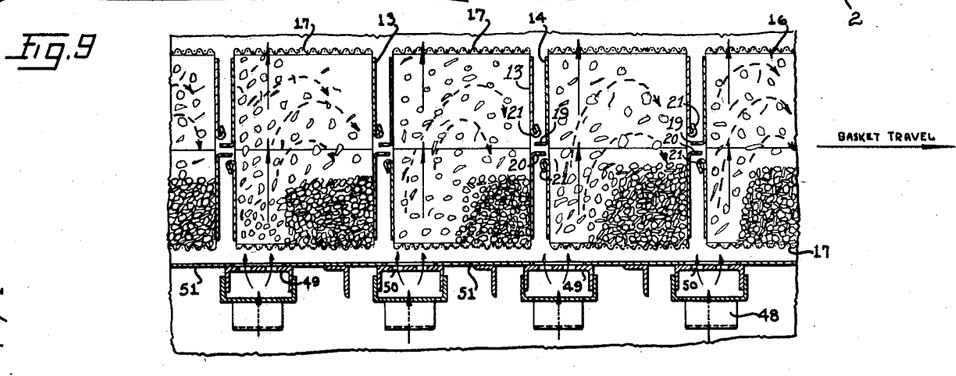
Figure 9 is a section on the line 9—9, looking in the direction of the arrows of Figure 8.
Figure 10:
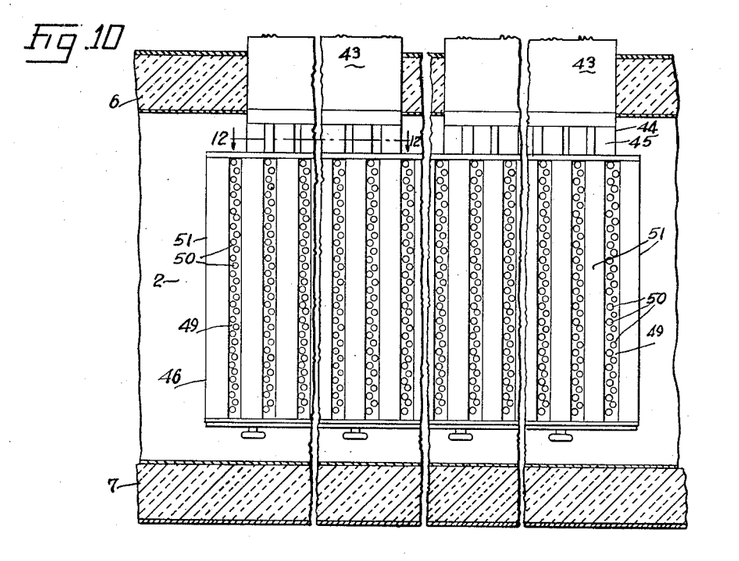
Figure 10 is a detail plan view showing the arrangement of the air jets for distributing the air upwardly through the foraminous containers or baskets with means for regulating their spacing and the application of the air jets.
Figures 11, 12:
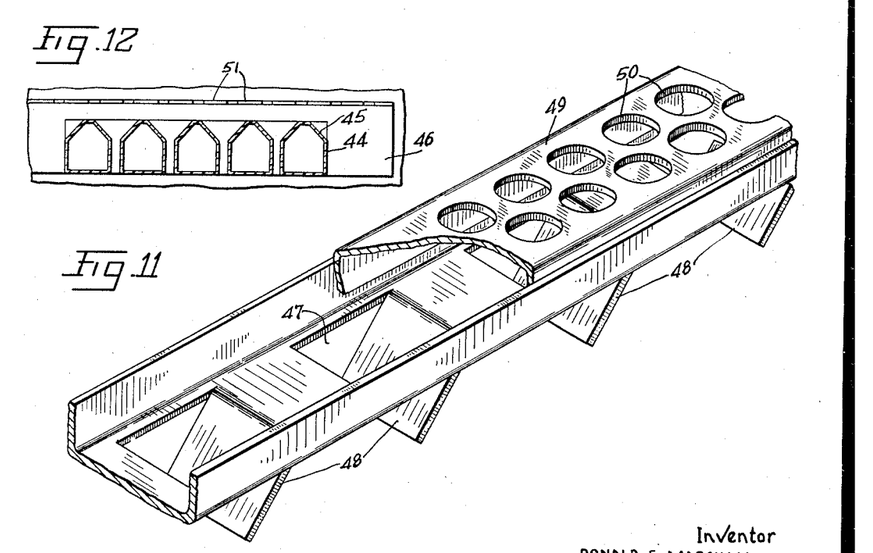
Figure 11 is a perspective view, partially in section, of an air directing trough with the means shown for creating air jets beneath the baskets.
Figure 12 is a section on the line 12—12, looking in the direction of the arrows, on Figure 10, showing the arrangement of the air ducts with sloping grooves so as to cause any particles of flakes, or flakes, or dust to readily descend to the bottom of the oven where the refuse is conveyed away from the oven.
Figures 13, 14:
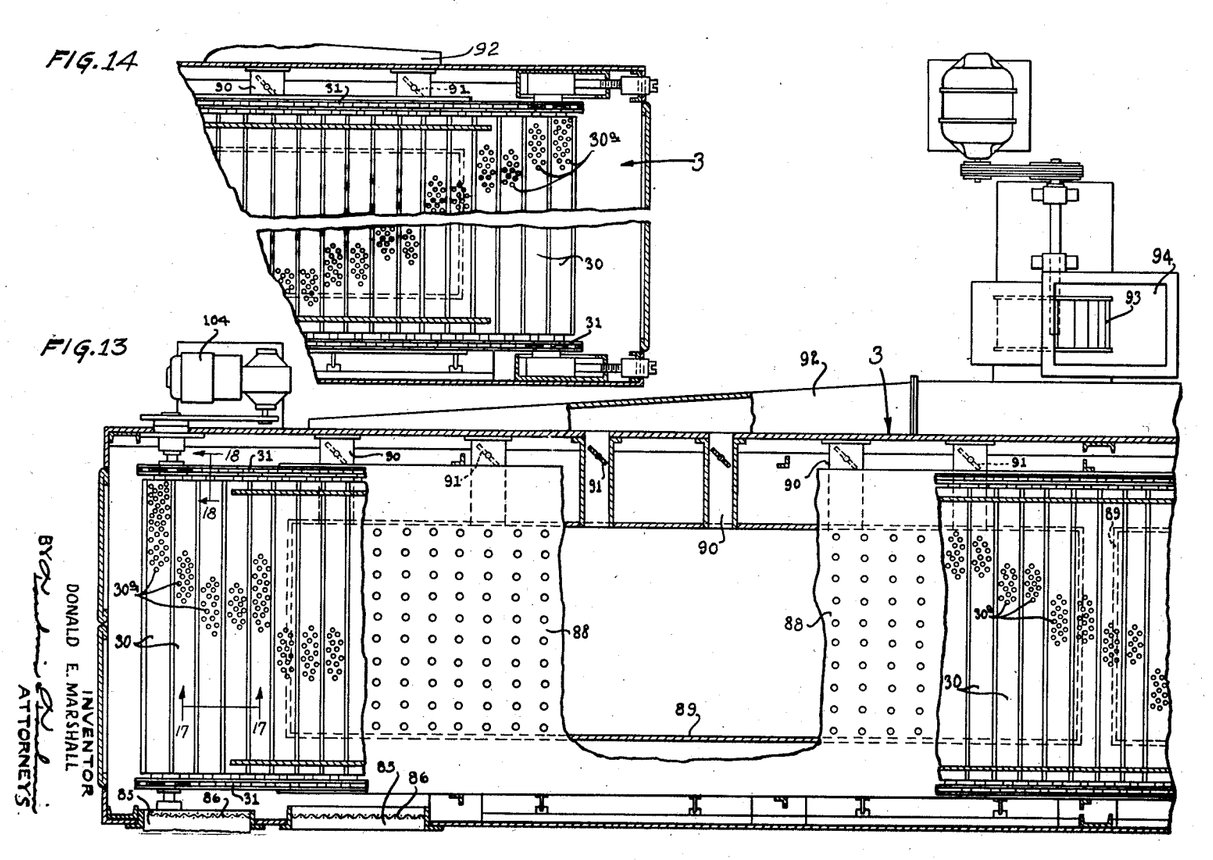
Figure 13 is a horizontal section through the cooling chamber portion of the oven. This section is taken on line 13—13 of Figure 1, looking in the direction of the arrows. The exhaust duct in the cooling chamber is shown partially broken away and the controlled exhaust passageway leading from the dust and shown in section in some instances.
Figure 14 is a similar view to Figure 13, showing the extreme right hand end of Figure 13.
Figure 15:
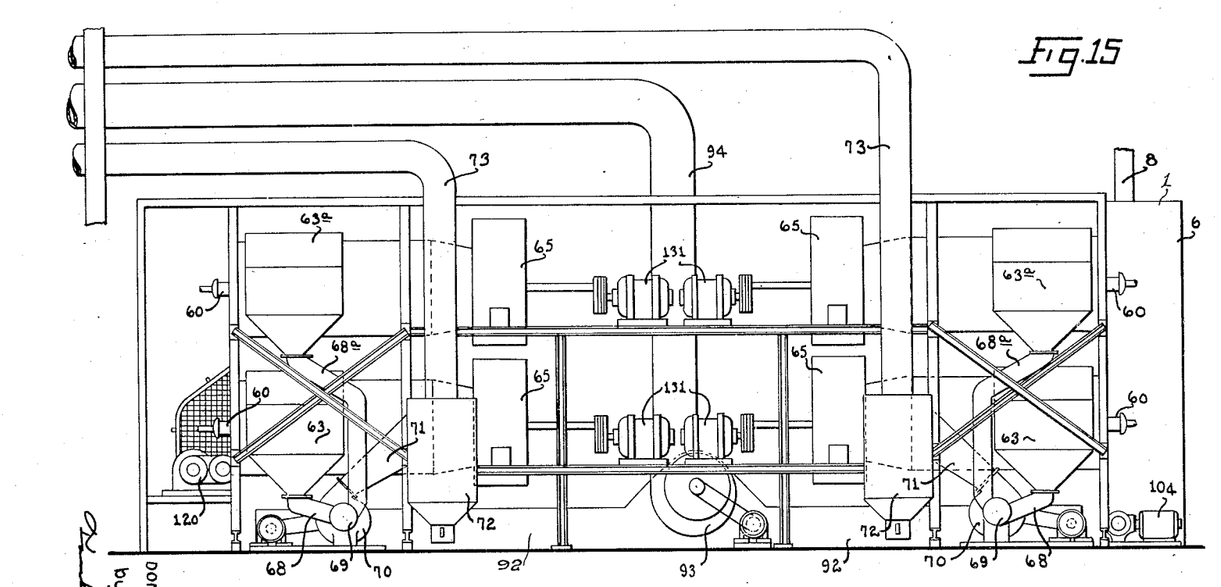
Figure 15 is a side elevation of the air circulating mechanism and the dust collecting mechanism.

It will be noted further from Figures 8 and 9 that the agitation of the flakes is purely by the air jets and that no mechanical handling of the flakes is necessary in order to agitate them and turn them over in the path of the heated air.

It will be further noted that this is a progressive treatment so that the entire body of the flakes will be tossed about continuously as the conveyor progresses in the direction of the basket's travel.

Air circulatory system

There are three problems involved in the air circulatory system of primary importance. The first is to provide heated air of adjusted progressive temperatures in different zones in the oven for progressively baking the flakes, which includes drying the flakes as well as baking them.

The second problem is one of drying and moisture control as the flakes give up their moisture during baking, the air picks up the moisture and the excess must be eliminated.

The third problem is one of providing continuously clean air and also of continuously cleaning the oven and its associated parts, so as to prevent any accumulation of dust, burnt or broken flakes or other foreign material in the oven.

Figures 16, 17, 18:
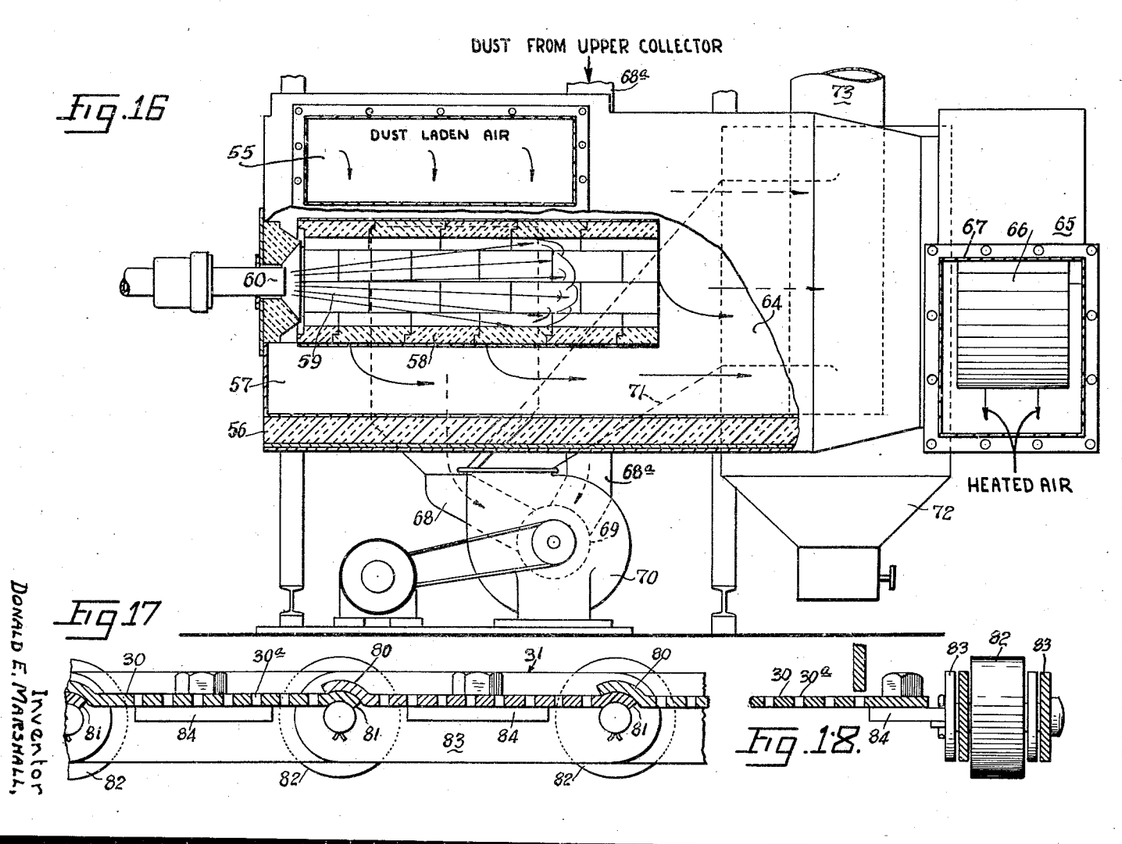
Figure 16 is a detail side elevation of the burner, heater and blower, partially in section.
Figure 17 is a section on the line 17—17, looking in the direction of the arrows on Figure 13.
Figure 18 is a section on the line 18—18, looking in the direction of the arrows of Figure 13, showing in detail one of the articulated perforated conveyor plates of the collecting conveyor and its means of support.
Figures 19, 20:
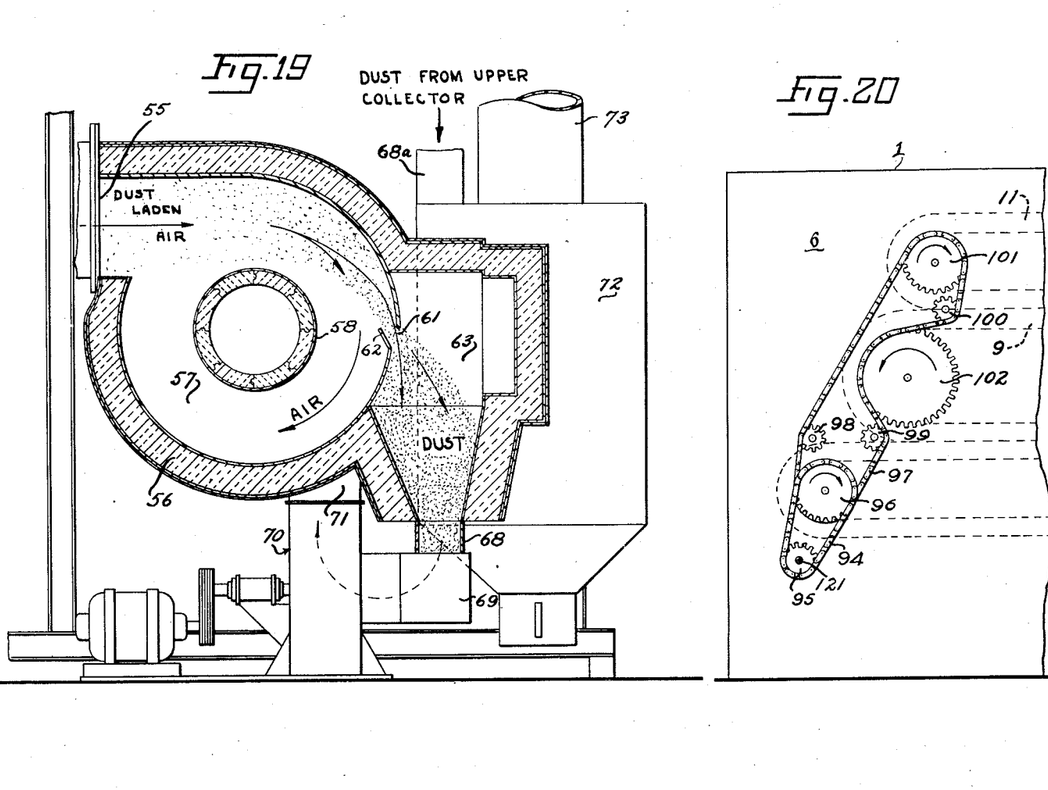
Figure 19 is a section, taken vertically and transversely, through a centrifugal collector, which acts as a primary collector for extracting dust and foreign material from the air. This primary collector is a part of the heater. The view also shows the secondary cyclone collector from which the remaining dust is extracted from the dust laden air.
Figure 20 is a detail view of the chain drive for the several conveyors in the oven.

By referring to Figures 3, 4, 15, 16 and 19, particularly, there will be observed a system consisting of the following essential elements. The air leaving the oven through an exhaust duct, such as 53, proceeds with its burden of dust through the pipe 54 into a combined dust collecting and heating chamber, which is shown in Figure 16 and Figure 19. The air with its burden of dust enters through the port 55 into this volute chamber 56, the interior of which is designated 57. The dust laden air circulates as indicated by the arrow in the volute about the heating chamber 58, in which is located the flame 59 from the burner 60.

The heavier particles of dust and some air pass through the opening 61 under the skimmer lip 62 into the dust hopper 63. The heavy particles of dust, as well as the lighter particles are thrown out centrifugally and are thus collected. The dust free air which remains in the chamber 57 near the center of it, circulates around the heating chamber 58 and finally progresses laterally, as will be seen in Figure 16 in the region of 64, into the eye of the fan casing 65, where the fan 66 discharges this dust free hot air back into an intake duct, such as that indicated at 43, through a pipe 67.

The dust with its entrained air in the hopper 63 descends through the passageway 68, passageway 69, and thence is conveyed by the fan 70, which discharges it into the pipe 71 into a cyclone dust collector 72, whence the dust is collected and the dust free air passes out through the pipe 73.

The fan 70 serves both the lower dust collecting hopper chamber 63 and the upper similar dust collecting hopper and chamber 63a. 63a communicates with the fan 70 through the pipe 68a.

The exact control of the heat and of the heaters forms no part of the instant invention, as any type of suitable burner may be employed.

Mechanical dust remover

As heretofore described, every precaution is taken to prevent the crushing and entrapment of the flakes which would either reduce the size of the flakes or cause dust or broken particles. However, whenever fine dust or refuse does occur, it falls without obstruction towards the bottom of the oven 2 until it rests upon the bottom plate 74. This bottom plate 74 is engaged by a transverse scraper plate 75 carried on the lowermost conveyor and is moved by the conveyor chains 25 of that conveyor. Thus the refuse is mechanically scraped from the plate 74 by the scraper 75 and dumped through the opening 76 into the transverse passageway 77, whence it can be removed. Cleaning pipes for air, such as the pipes 78, and steam pipes, such as the pipes 79 may be provided to further facilitate the cleaning of the parts by blowing.

Cooling

The flakes are discharged from the baskets 24 through the chute 20 onto the perforated articulated cooler plates 30 as heretofore described.

Referring particularly to Figures 13, 14, 17 and 18, it will be noted that these plates 30 have arcuate overlapping flanges 80 and 81. 82 represents the conveyor chain rollers and 83 the links. These perforated plates 30, having openings 30a, are supported at their ends upon plates 84 on the links 83 of the chains 31.

In order to supply cooling air to the chamber 3 to cool the flakes, incoming cool air is taken through ports 85 (Fig. 2), through screens 86, which may or may not be provided with louver guides 87. The air passes over and through the flakes through the perforated conveyor plates 30 and thence through the perforated plate 88 into the box 89 and thence out through a plurality of ducts 90 controlled by dampers 91 into a header pipe 92 into the eye of an induction fan 93, whence the air is discharged through the pipe 94. In this way a continuous circulation of fresh air is provided for cooling the flakes as desired.

This cooling also has the result of crisping the flakes to complete their treatment. It is desirable not to package flakes when in a warm condition because moisture would condense, the flakes would be soft and unpalatable. It is essential that dry crisp flakes of the maximum size be produced. Prior to the cooling operation, the application of the hot air to the flakes which contained moisture resulted in causing the moisture in the flakes to steam, thereby forming small blisters over the surface of the flakes, which increases the crispness of the flakes.

Coordinated drive

The sprocket 95 drives the chain 94. The other end of the chain is mounted on the sprocket 96, which has connected to it a companion sprocket for driving the chain 97 that passes over the idlers 98, 99 and 100, the upper conveyor sprocket 101 and intermediate conveyor sprocket 102. The sprocket 96 is utilized to drive the lowest of the three conveyors.

*Control*

Figure 4:
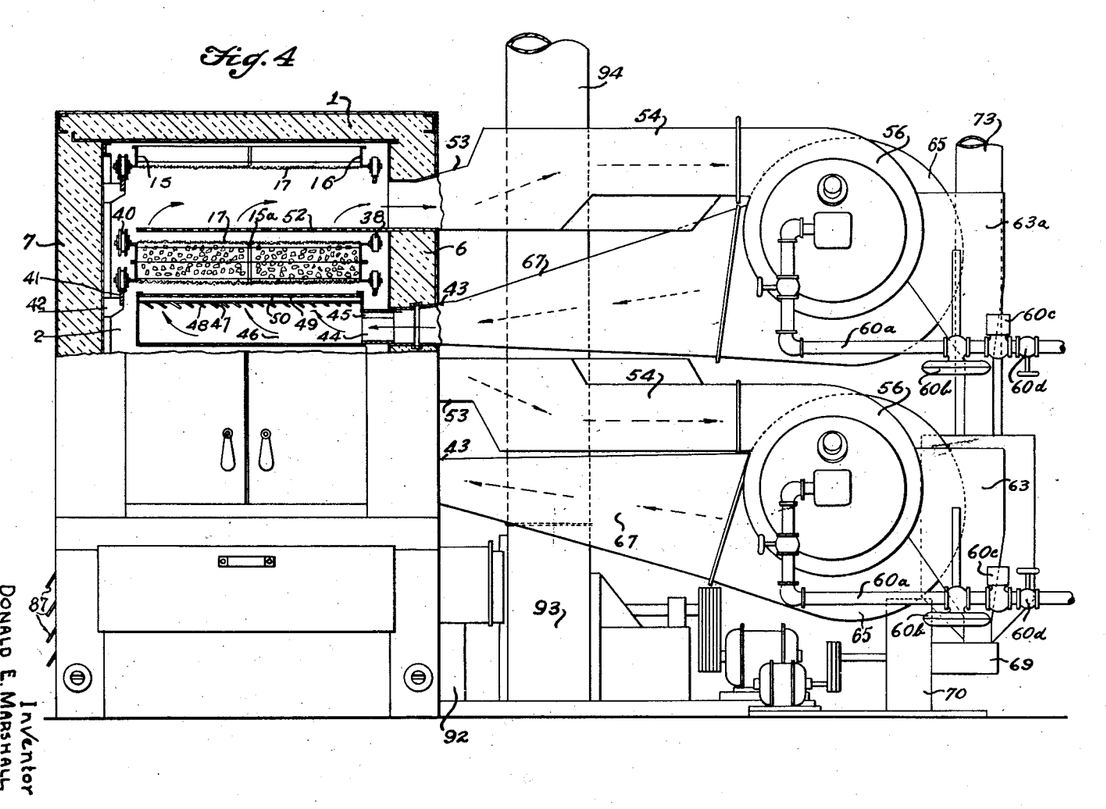
Figure 4 is an end elevation of the oven, partially in section, showing the arrangement of the interior of the oven and partly the air circulatory and dust collection system.
Figures 5, 6:
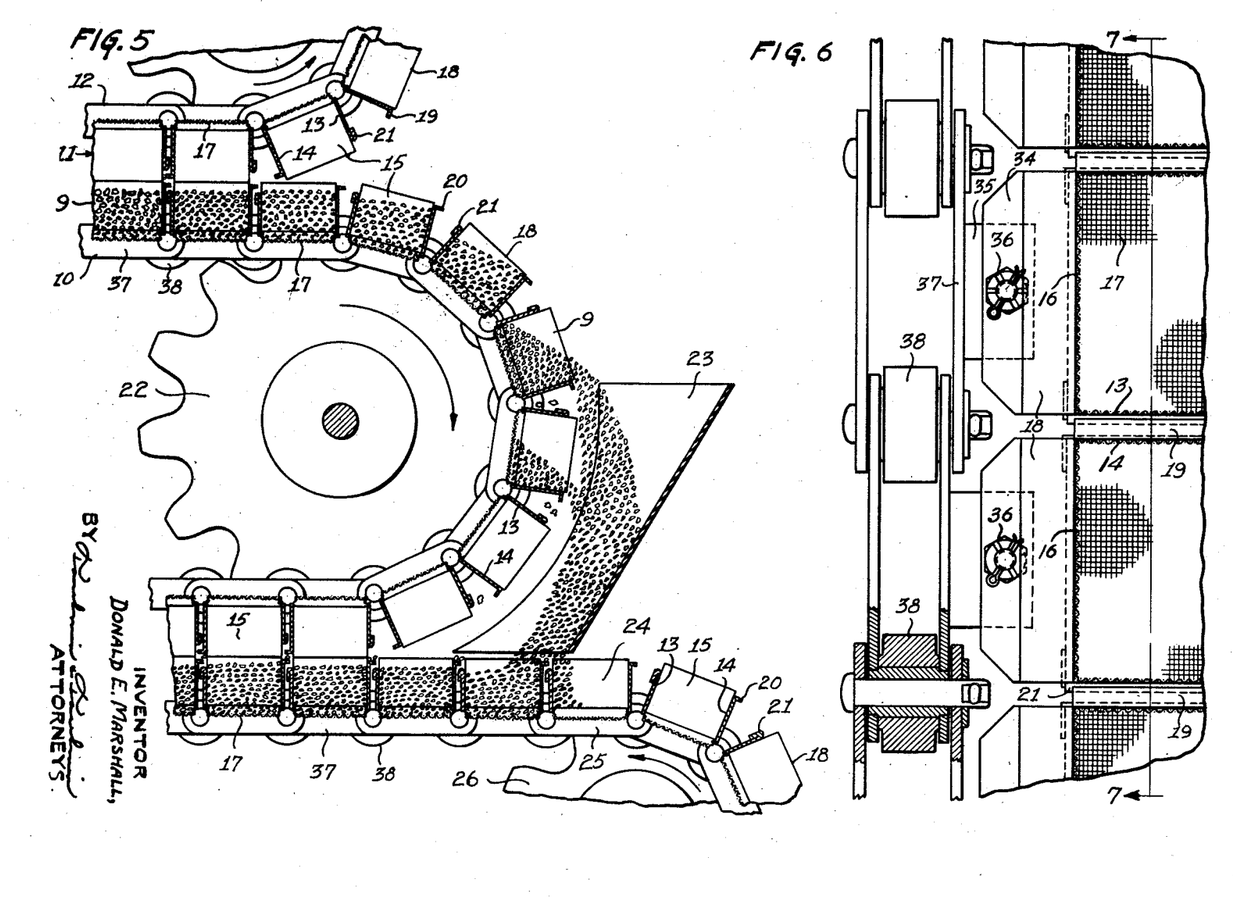
Figure 5 is a detail view, in section, of one end of the group of conveyors showing the means and mechanism of transferring the flakes from one conveyor to another.
Figure 6 is a top plan view of one end of the conveyor baskets and one chain, part of the chain being shown in section.
Figure 7:
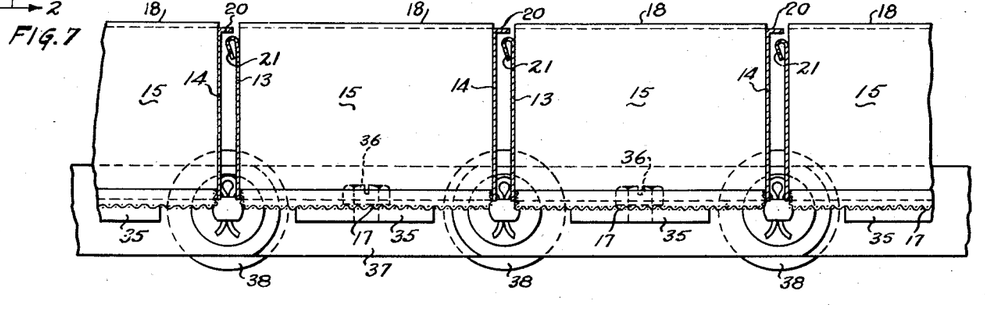
Figure 7 is a section on the line 7—7, looking in the direction of the arrows of Figure 6.

The burner 60 is supplied with gas through the pipe 60a (Fig. 4). The gas passes by a pressure regulator 60b. The suitable valves 60c and 60d are provided. The exact arrangement of the valves is not important so long as the gas is controlled in its supply to the burner. 60e is a solenoid valve hereinafter described.

Figure 21:
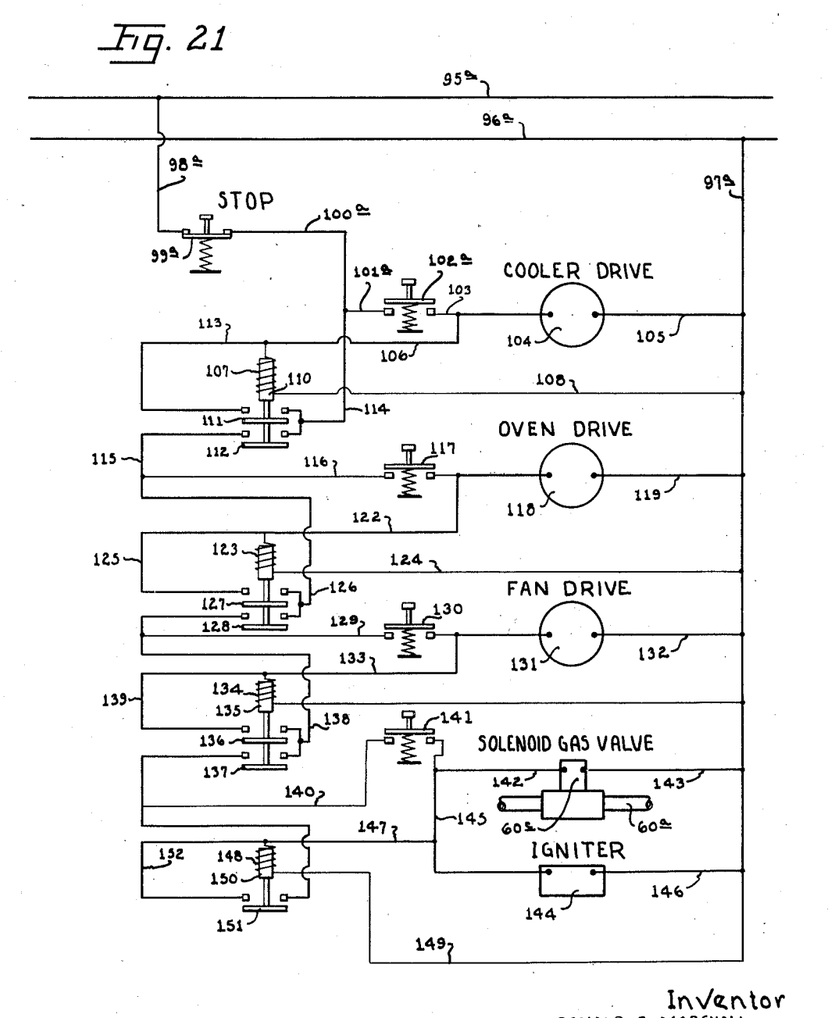
Figure 21 is an electrical diagram showing schematically the sequence of operations in order to effect the starting and control of the apparatus of this invention.

By reference to Figure 21, there will be noted power lines 95a and 96a. Line 95a has a bus line 97a. The line 95a is provided with a line 98a, in which is located a stop switch 99a that is connected to a line 100a. The line 100a is provided with a line 101a controlled by a switch 102a, which connects it to a line 103, which in turn is connected to a motor 104, the other side of which is connected by the line 105 to the bus line 97a.

This motor 104 is a so-called cooler drive motor for actuating the cooling conveyor 30 and the chains 31. This results, upon closing switch 102a, in two things. The motor 104 starts and runs the cooling conveyor and secondly, the line 106 is energized so as to energize the coil 107, which is connected by the line 108 to the line 97a.

This operates the solenoid 110, causing the switches 111 and 112 to engage and contact, bringing the line 113 in circuit with the line 114. This serves as a holding circuit. The switch 112 connects line 114 to the line 115, which supplies current to the line 116. The next step is to manually close switch 117, which brings the motor 118 of the oven drive into circuit because it is connected by the wire 119 to the bus line 97a. This motor 118 drives through a stop gear reduction unit 120, the shaft 121, on which is mounted the sprocket 95, that in turn drives the chain 94, as heretofore described.

The closing of switch 117 energizes the line 122, coil 123 and line 124 connected to the bus line 97a. This also energizes the holding circuit consisting of lines 125 and 126, which are closed by the switch blade 127. The blade 128 connects the line 126 to the line 129. This line is closed by the manual closing of the switch 130, which connects the fan motors 131 in circuit with the bus line 97a through the line 132. This operation in turn energizes the line 133, coil 134, causing the solenoid 135 to close the switch blades 136 and 137. This results in energizing the circuit 138 and 139. It also brings into circuit the line 140, which is connected by the switch 141 through the wire 142 to the solenoid of the solenoid valve 60c, that in turn is connected by the wire 143 to the bus line 97a.

This opens up the gas line 60a. Likewise the igniter 144 is brought in circuit to ignite the gas because it is connected by the wire 145 and wire 146 to the bus line 97a. This also results in energizing the holding circuit consisting of the wire 147, coil 148 and line 149. The solenoid 150 closes the switch 151, which brings in circuit the wires 152 and 153.

It will be understood that it is desired to comprehend within this invention such modifications as may be necessary to adapt it to varying conditions and uses.

Having thus fully described this invention, what is claimed as new and is desired to secure by Letters Patent, is:

1. In a machine for treating corn flakes, means for conveying the flakes progressively through the machine in batches, means for circulating air to and from the machine and through each batch of flakes independently of other batches to both treat and agitate the flakes without mechanical handling, and means for directing said air at intervals through said flakes in jets and through restricted portions of each batch of the flakes to cause a rotary movement of the flakes in each batch.

2. In combination, in a corn flake toasting oven, an oven, means for conveying flakes therethrough, means for supplying and exhausting air therefrom, a dust collecting means in the circuit of the air so circulated whereby the air from the oven is cleaned and then returned to the oven, means in said oven for collecting particles heavier than the air can convey, and means for removing said particles.

3. In combination, with an oven for toasting corn flakes, an oven, means for conveying the flakes in batches, means for circulating air to and from the oven for toasting each batch progressively, and for removing dust and broken particles from each batch, means for simultaneously heating the air removed and for collecting the dust therefrom, means for causing the air to so circulate to and from the oven, and means for guiding the air passing through each batch of corn flakes in a substantially vertical direction, and means for forming said air into spaced jets adapted to deliver air to a portion only of each batch to cause a rotative agitation of the flakes in each batch.

4. In combination, in a corn flake oven, means for conveying flakes therethrough in batches at different levels, means for conveying hot air to and through said flakes at different levels, said hot air-conveying means including means for sub-dividing said air in independent channels, and also including means for guiding said air substantially vertically in spaced groups of air jets through said flakes, said jets being supplied with air from said channels.

5. In an oven for toasting corn flakes, means for conveying the flakes progressively through the oven in batches, means for circulating air to and from the oven and through each batch of flakes independently of other batches to both treat and agitate the flakes without mechanical handling; said means including a plurality of compartments arranged transversely of the line of travel of the batches and positioned directly below the batches, perforated covers for the compartments, means for introducing heated air simultaneously to all of said compartments whereby the effect of a plurality of spaced jets is obtained and each batch is caused successively to move over each line of said jets.

6. In a machine for treating corn flakes, means for conveying the flakes progressively through the machine in batches, means for circulating treating air to and from the machine and through each batch of flakes independently of other batches to both treat and agitate the flakes without mechanical handling, and means for directing said air at intervals through said flakes in jets and through restricted portions of each batch of flakes to cause a rotary movement of the flakes in each batch, said means including a plurality of spaced compartments extending across the line of travel of the batches and having perforate tops to produce jet effects when treating air under pressure is introduced into each of said compartments.

7. In an oven for toasting corn flakes, means for conveying the flakes progressively through the oven in batches, means for circulating air heated to toasting temperature to and from the oven and through each batch of flakes independently of other batches to both toast and agitate the flakes without mechanical handling, means for directing the toasting air at intervals through said flakes in jets and through restricted portions of each batch of the flakes to cause a rotary movement of the flakes during the toasting process in each batch.

DONALD E. MARSHALL.